United States Patent [19]
Lui et al.

[11] Patent Number: 5,812,754
[45] Date of Patent: Sep. 22, 1998

[54] RAID SYSTEM WITH FIBRE CHANNEL ARBITRATED LOOP

[75] Inventors: Albert S. Lui, Cupertino; Ronald John Naminski, Mountain View; James Wesley Oliver, San Jose; Radek Aster, Sunnyvale; Neill Preston Wood, Los Gatos, all of Calif.

[73] Assignee: Silicon Graphics, Inc., Mountain View, Calif.

[21] Appl. No.: 718,743

[22] Filed: Sep. 18, 1996

[51] Int. Cl.⁶ .................................................. G06F 11/00
[52] U.S. Cl. ........................................................ 395/182.04
[58] Field of Search .................. 395/182.04, 182.03, 395/182.05, 182.06, 441; 371/21.1, 21.6, 40.15

[56] References Cited

U.S. PATENT DOCUMENTS

| | | | |
|---|---|---|---|
| 5,072,378 | 12/1991 | Manka | 395/575 |
| 5,148,432 | 9/1992 | Gordon et al. | 371/10.1 |
| 5,155,845 | 10/1992 | Beal et al. | 395/585 |
| 5,237,658 | 8/1993 | Walker et al. | 395/200 |
| 5,257,391 | 10/1993 | DuLac et al. | 395/800 |
| 5,274,799 | 12/1993 | Brant et al. | 395/585 |
| 5,285,451 | 2/1994 | Henson et al. | 371/11.1 |
| 5,325,363 | 6/1994 | Lui | 371/8.1 |
| 5,379,417 | 1/1995 | Lui et al. | 395/575 |
| 5,396,596 | 3/1995 | Hashemi et al. | 395/200 |
| 5,469,453 | 11/1995 | Glider et al. | 371/68.1 |
| 5,522,065 | 5/1996 | Neufeld et al. | 395/182.04 |
| 5,548,711 | 8/1996 | Brant et al. | 395/182.03 |
| 5,608,891 | 3/1997 | Mizuno et al. | 395/441 |

OTHER PUBLICATIONS

Seagate Technology, "RAID 5 Support on SCSI Disk Drives," Rev. 1.5, Jul. 13, 1994, pp. 5–13.
6700/10 Disk Array Guide (Ciprico Disk Array System), Chapter 1, pp. 1–1 through 1–4, and Chapter 2, pp. 2–1 through 2–2, Date Unknown.
Fibre Channel Arbitrated Loop (FC–AL), Rev. 4.34, Sep. 15, 1994, pp. 1–87.
"CLARiiON 2000 Series Disk Array Wide Version," Data General Corporation, Jun. 4, 1993, pp. 1–22.
G. Houtekamer et al., "MVS I/O Subsystems," Cached Control Units, McGraw–Hill, Inc., 1993, pp. 160–168.
Patterson et al., A Case for Redundant Arrays of Inexpensive Disks (RAID), Report No. UCB/CSD 87/391, Dec., 1987, Computer Science Division (EECS), University of California, Berkeley, California, pp. 1–24.

Primary Examiner—Vincent P. Canney
Attorney, Agent, or Firm—Sterne, Kessler, Goldstein & Fox P.L.L.C.

[57] ABSTRACT

A modular and highly available RAID system has a fiber channel arbitrated loop (FC-AL) interface coupled with a disk array. Fault-tolerant operation is assured. The system provides dual and isolated arbitrated host and storage device loop circuits for redundant, independent input/output (I/O) paths to local and/or remote host computers. Each loop includes bypass circuits which prevent the failure of any device (host computer or storage device) from affecting the operation of loop. Orthogonal data striping may be used to further assure data integrity.

13 Claims, 6 Drawing Sheets

RAID SYSTEM WITH FIBRE CHANNEL ARBITRATED LOOP

RELATED APPLICATION

This application is related to U.S. patent appl. Ser. No. (to be assigned), filed on even date herewith, attorney docket number 154-225.00, entitled "Modular And Highly Available RAID System and Method For Video On Demand Applications," which is incorporated herein by reference.

BACKGROUND OF THE INVENTION

1. Field of the Invention

The present invention relates generally to data storage array systems. More particularly, the present invention relates to systems for ensuring fault-tolerant operation with data storage array subsystems.

2. Related Art

Conventional computer systems typically include one or more data storage devices. In addition, these systems usually include several different types of data storage devices, such as tape and disk (e.g., magnetic, optical, and semiconductor) drives. One of the paramount issues associated with computer systems is data storage reliability, particularly with large systems (e.g., database servers, video servers and network file savers). For example, computer system downtime has a direct impact on the profitability, productivity, and competitiveness of a corporation. The trend toward greater dependence on computer systems only magnifies the real cost of downtime.

While there are numerous correcting techniques employed to detect and correct media defects or lost data in magnetic storage devices, they only cover a very small subset of all failure conditions. For example, such conventional codes provide no remedy to catastrophic storage device failure like recording head crash, loss of internal power, logic or interface malfunction.

Accordingly, conventional computer systems have used various data storage architectures to provide reliability "external" to individual storage devices. These conventional architectures have been catalogued under the acronym "RAID" (redundant arrays of inexpensive disks) and correspondingly organized into six levels, RAID 0–5. See, generally, Patterson, et al., *A Case for Redundant Arrays of Inexpensive Disks*, Proc. ACM SIGMOD, June 1988. The RAID levels are not ratings, but rather classifications of functionality.

In general, RAID architectures (as well as other data storage device array systems) include two primary components: a storage device array and one or more RAID controllers. The RAID controllers are connected to the host system and the storage device array through two discrete Input/Output (I/O) bus structures, the front-end host interface and the back-end drive interface.

The various RAID architectures/levels and implementations can be comparatively evaluated in terms of four parameters: data availability, data integrity, architecture modularity/flexibility, and I/O interface characteristics. Data availability is one of the major benefits provided by RAID architectures. Data availability is the level of fault tolerance within the RAID system. The more component (e.g., disk, controller, and interface) failures that can occur without losing access to data, the higher the level of availability. In general, RAID availability is enhanced by providing various degrees of disk, controller, and interface redundancy. Higher data availability remains a prevalent issue in the industry.

Data integrity is the ability of a RAID system to operate and withstand failures without data corruption. The absolute preservation of data integrity under any adverse condition is essential across virtually all computer system implementations. Correspondingly, the concepts of data availability and data integrity are tightly knit. While data integrity refers to preventing data corruption during failures, data availability refers to maintaining access to information after a failure.

Architecture modularity/flexibility is another significant parameter of RAID based systems. This parameter is the ability of the RAID architecture to be augmented for new and evolving applications. In other words, this parameter measures how well the architecture provides modular configuration changes, such as storage device expansion or replacement (in terms of costs, installation complexity, and on-line or hot-repair capabilities). This parameter is also an increasingly important issue in the current business environment. That is, since it is very difficult to predict long term system requirements, a system that provides modularity/flexibility invariably enhances investment protection.

Another measure of architecture flexibility is ease of floor-planning for large systems installation. Very often, signal integrity constraints limit how many storage devices can be attached to a host system.

The fourth parameter is I/O interface performance. This parameter measures issues such as interface costs, throughput, bandwidth, and drive capabilities. In addition, this parameter indicates how well the architecture supports different RAID levels concurrently. Typically, I/O interface performance not only varies greatly between RAID levels, but also among implementations of the same level.

For example, while the Data General CLARiiON 2000 supports several RAID levels (0, 1, 3, and 5), this RAID system utilizes Small Computer System Interface (SCSI-2) busses for all the interconnection between the storage device array subsystem, array controllers, and host computers. Correspondingly this type of system has a number of limitations. First, the maximum number of allowed devices on any one SCSI-2 bus is relatively low (less than 16 devices). Second, the maximum bus (or cable length) is approximately 3–25 meters, which is only suited to those applications in which the entire computer system can be located at the same facility or office. Even in the same computer room, it is difficult to connect a large number of SCSI devices to a host system because of this cable length limitation. Third, the SCSI-2 interface speed is relatively slow (20 megabytes/second (MB/s)). Fourth, the number of individual SCSI-2 busses required to drive the interface is relatively high (approximately 5–10). And finally, it is impossible to add extra storage capacity on-line without powering down the entire system.

Another popular RAID implementation utilizes an ANSI standard fibre (or fiber) channel (FC) interface for host computer and array controller interconnections, rather than SCSI busses. See, for example, U.S. Pat. No. 5,237,658 to Walker et al., entitled "Linear and Orthogonal Expansion of Array Storage in Multiprocessor Computing Systems." In particular, such systems utilize two FC switching fabrics for fault-tolerant interconnection between host computer systems and array controllers as the front-end host interface. As with the SCSI interfaced RAID system, however, this type of system utilizes multiple SCSI busses (typically 5 to 10) as the back-end drive interface to interconnect the storage device array subsystem and the array controllers.

In comparison with SCSI interfaced RAID systems, FC interfaced RAID systems offer greater interconnection distances between the host computers and the array controllers (up to 500 meters), higher maximum interface speeds, potentially lower interconnection costs, and better modularity/flexibility.

However, there is a cost premium associated with FC interfaced systems. The cost of adding the FC switching fabric for linear expansion and the use of multiple SCSI busses for the drive interface is significant. In addition, this type of system typically requires more physical space to accommodate the FC switching fabric hardware as well as the associated SCSI cables and harnesses.

SUMMARY OF THE INVENTION

The present invention is a modular and highly available redundant array of inexpensive disks (RAID) system having fibre channel arbitrated loop (FC-AL) interfaces for ensuring fault-tolerant operation. One predominant features of the system of the invention is that it has dual and isolated arbitrated host and storage device loop circuits. The dual loop circuits provide redundant, independent input/output (I/O) paths for the host computers systems and the storage devices of the disk array. As such, operation of the system is not thwarted by failure of any one loop.

An important feature of the present invention is the incorporation in each RAID controller of a host interface loop with a plurality of host interface ports. Each port has a port bypass circuit. The port bypass circuits prevent the failure of any device (e.g., host computer or storage device) from affecting the normal operation of loop. This arrangement allows for the continuous and uninterrupted operation of the front-end host interface in multi-host attached environments, even in the event that one or more hosts fail or power down in the same host interface loop. This eliminates the need of costly switching fabric or network hub hardware.

The present invention also provides dual and isolated environmental controllers and busses to monitor the operational status of each storage device in the system and provide control to the bypass circuits. Thus, failure of a storage device or an environmental bus failure does not affect loop operation.

Another embodiment of the present invention provides dual and isolated star couplers at the back-end drive interface. The star couplers permit on-line storage device repair and re-configuration without interfering with system operation.

Still another embodiment of the present invention provides orthogonal RAID level 3 and RAID level 5 data striping. The orthogonal data striping permits an entire storage module (including multiple storage devices) to be removed without loss of data. Correspondingly, each storage module can be built with a single power supply and fan for cost reduction.

The foregoing and other features and advantages of the invention will be apparent from the following, more particular description of the preferred embodiments of the invention, as illustrated in the accompanying drawings.

BRIEF DESCRIPTION OF THE FIGURES

Referring now to the drawings which form a part of this original disclosure.

The preferred embodiments of the invention are described with reference to the figures where like reference numbers indicate like elements. Also in the figures, the left most digit of each reference number corresponds to the figure in which the reference number is first used.

DETAILED DESCRIPTION OF THE PREFERRED EMBODIMENTS

The preferred embodiments of the invention are discussed in detail below. While specific model numbers and/or configurations are discussed, it should be understood that this is done for illustration purposes only. A person skilled in the relevant art will recognize that other components and configurations may be used without parting from the spirit and scope of the invention.

Figure 1:
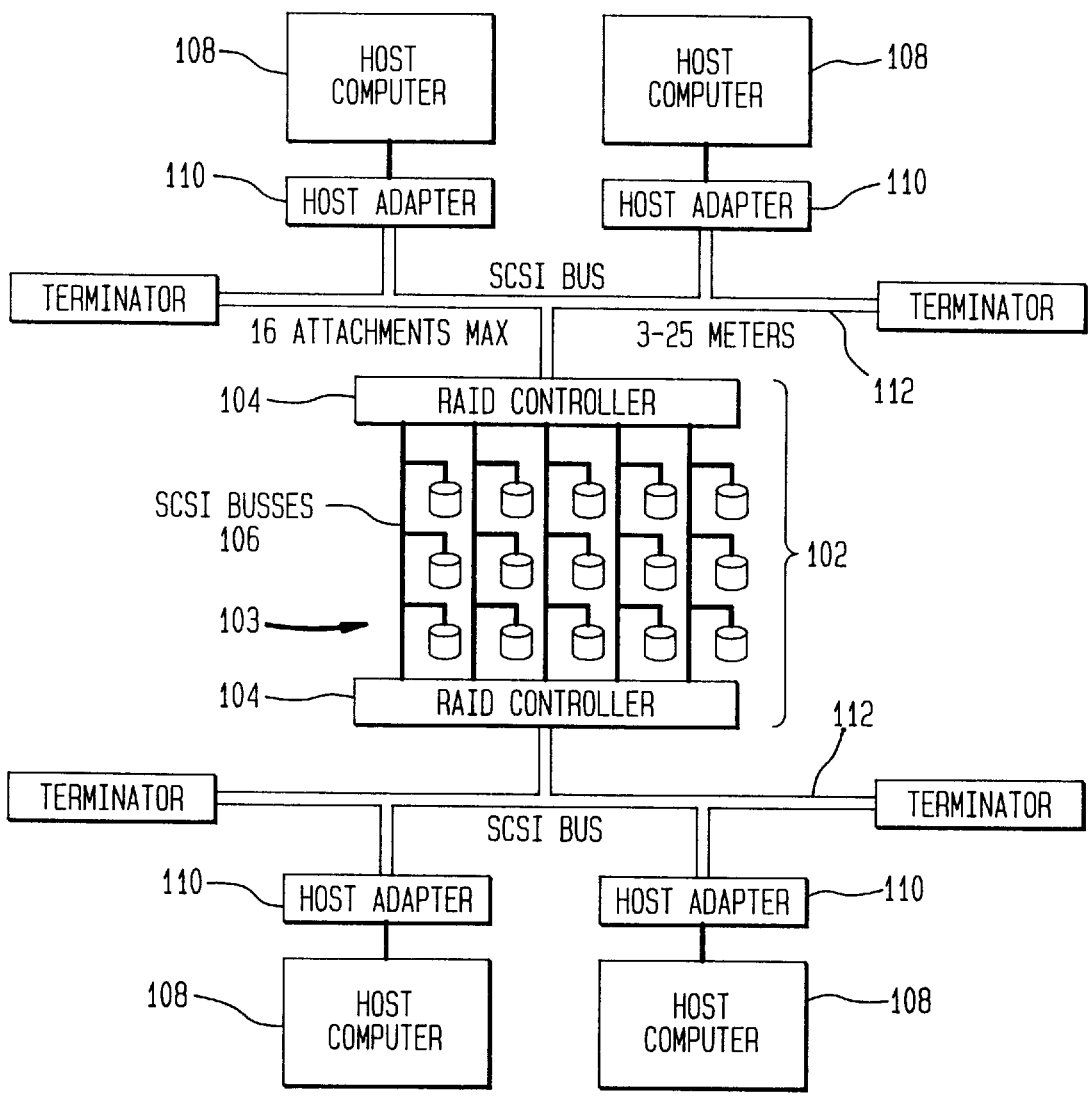
FIG. 1 illustrates a conventional RAID system with SCSI buses coupling the disks within the disk array and SCSI buses coupling the RAID subsystem to the host computers.

Prior to describing the preferred embodiments of the present invention two conventional RAID architectures are discussed for purposes of comparatively illustrating the advantages of the present invention. FIG. 1 illustrates a conventional Small Computer Serial Interface (SCSI-2) coupled redundant array of inexpensive disks (RAID) system 100 (SCSI RAID system 100). SCSI RAID system 100 includes host computer systems 108 and a RAID subsystem 102. RAID subsystem 108 includes RAID controllers 104 and a storage device (e.g., disk) array 103. RAID controllers 104 and disk array 103 are connected by array SCSI busses 106. RAID controllers 104 and host computers 108 are connected via host adaptors 110 and host SCSI busses 112.

Figure 2:
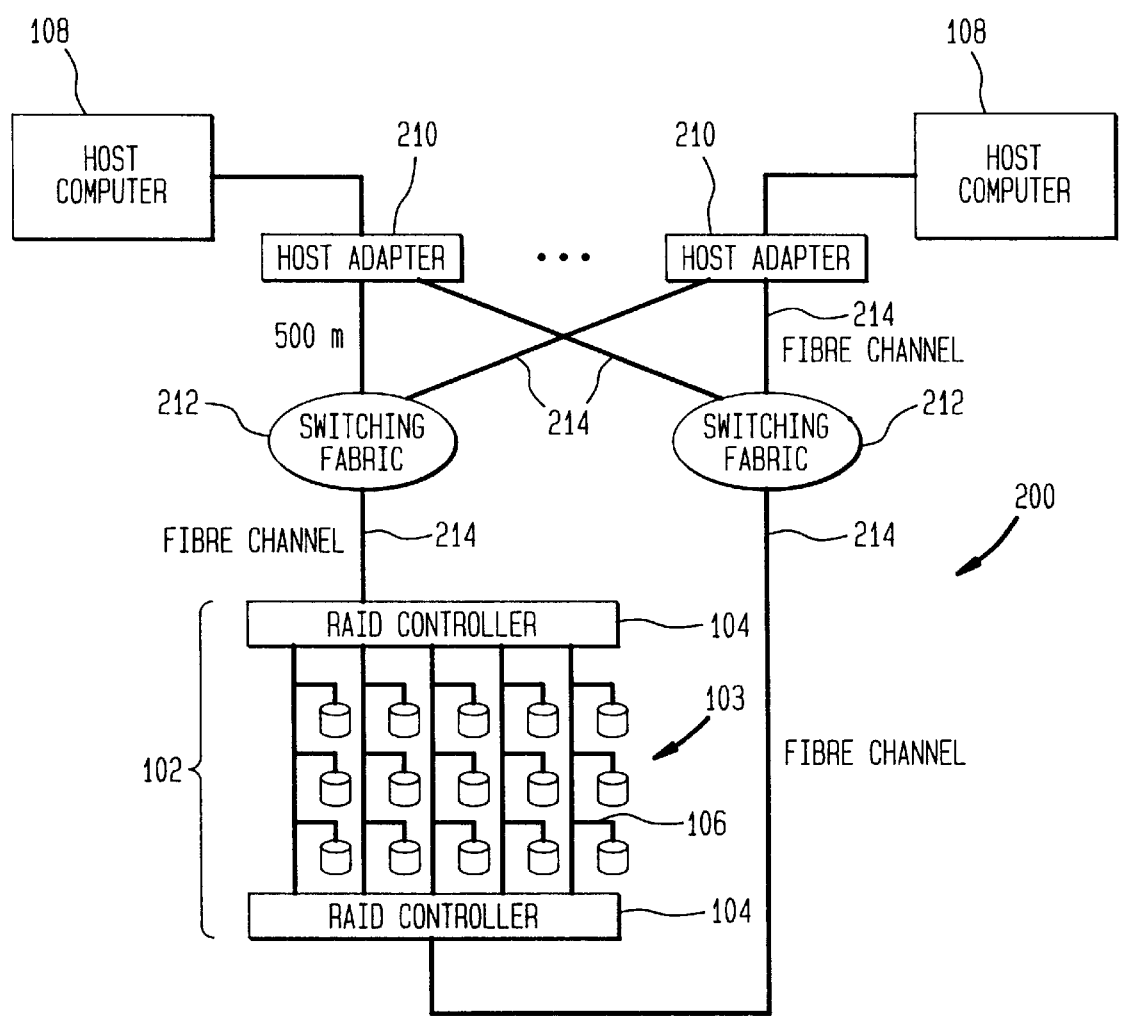
FIG. 2 illustrates a conventional RAID system with SCSI buses coupling the disks within the disk array and a fibre channel (FC) interface coupling the RAID subsystem to the host computers.

FIG. 2 illustrates a conventional fibre (or fiber) channel (FC) interfaced RAID system 200 (FC RAID system 200). As in RAID system 100, FC RAID system 200 includes host computer systems 108 and RAID subsystem 102. RAID subsystem 102 includes RAID controllers 104 and disk array 103. RAID controllers 104 and disk array 103 are connected by array SCSI busses 106. However, FC RAID system 200 also includes a FC interface between host computers 108 and RAID controllers 104. The FC interface includes host adaptors 210, switching fabric 212, and fibre channels 214.

As with the SCSI interfaced RAID system 100, FC RAID system 200 uses multiple SCSI busses (typically 5 to 10) as the back-end drive interface to interconnect disk array 103 and the RAID controllers 104. Because of the fibre channel at the host interface, however, FC RAID system 200 offers greater interconnection distances (up to 500 meters and greater) between host computers 108 and RAID controllers 104, higher maximum interface speeds, potentially lower interconnection costs, and better modularity/flexibility.

This type of FC RAID system 200, however, is not ideal. It yields no improvement at the RAID controller to disk array interface over the full SCSI RAID system 100. In addition, at the FC host interface, the cost of adding the FC switching fabric for linear expansion is significant. Furthermore, this type of system typically requires more physical space to accommodate the FC switching fabric hardware as well as the associated SCSI cables and harnesses.

Figure 3:
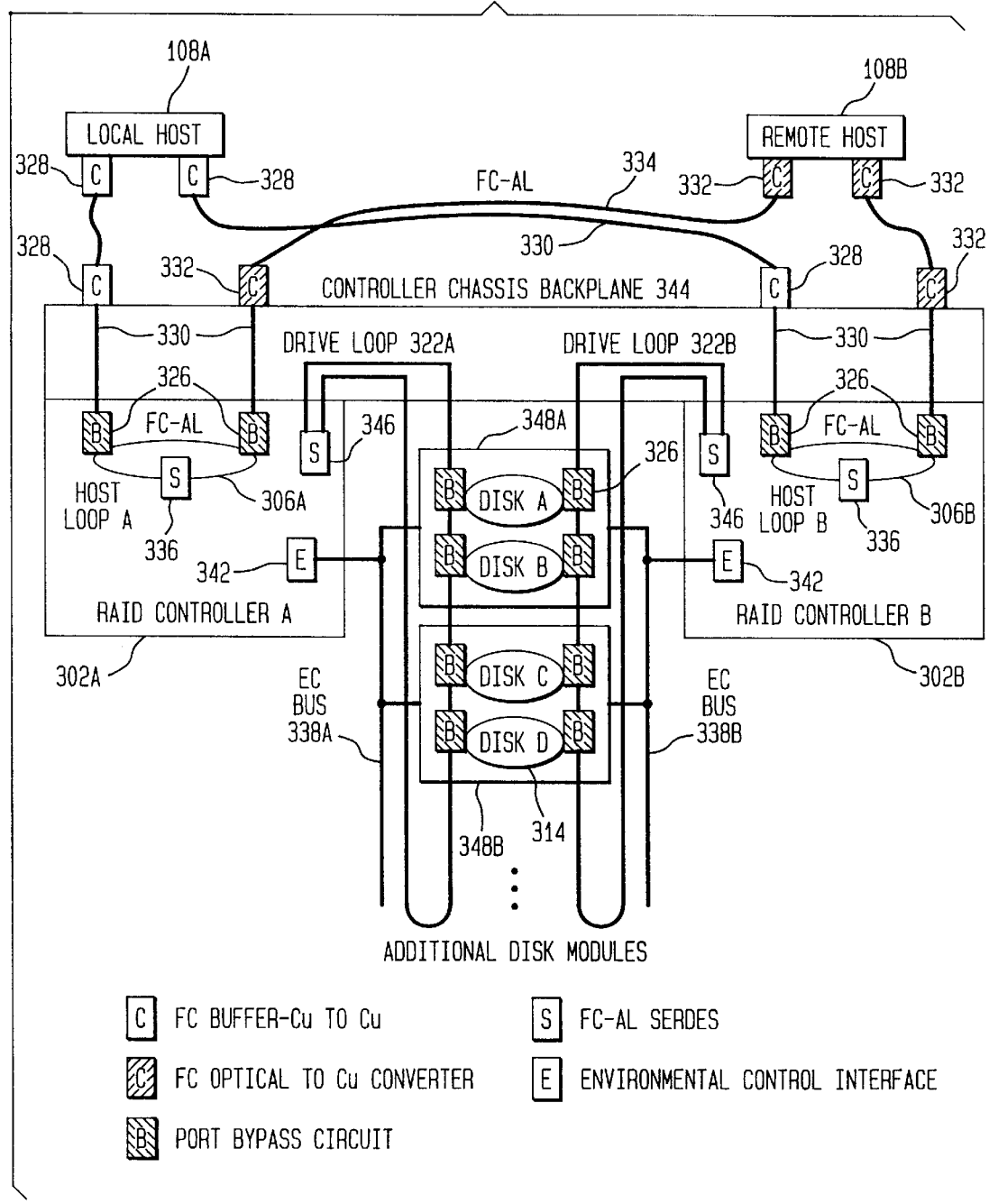
FIG. 3 illustrates a modular and highly available fibre channel arbitrated loop (FC-AL) RAID system, according to the present invention, in which disks within the disk array are coupled to RAID controllers via dual and redundant fiber channel arbitrated (drive) loops and the RAID subsystem is connected to the host computers via dual and redundant fiber channel arbitrated (host) loops.

The first preferred embodiment of the present invention is shown in FIG. 3 as fibre channel arbitrated loop (FC-AL) coupled RAID system 300 (FC-AL RAID system 300). As used herein, the terms "FC-AL" and "loop" are used interchangeably. In the preferred embodiment of the invention, the loops are arbitrated according to the ANSI Fibre Channel Protocol. In addition, although the term RAID is used to describe several preferred embodiments, it would be apparent to one skilled in the relevant art that the present invention is applicable with other storage disk array subsystems which may significantly deviate from the currently delineated RAID levels.

As will be apparent from the following discussion, FC-AL RAID system 300 provides several significant benefits over conventionally interfaced RAID systems (e.g., SCSI RAID system 100 and FC RAID system 200), including increased reliability, interface speed and throughput, and storage capacity. FC-AL RAID system 300 includes Disk Modules 348A and 348B and RAID Controllers 302A and 302B. The front-end interface from RAID Controllers 302 to host computers 108 is provided, in part, by host loops 306A and 306B, which are operably isolated and independently controlled.

The host loops are coupled to either local or remote host computers 108 through port bypass circuits (PBCs) and serializer/de-serializer modules 336 in RAID controllers 302. In this preferred embodiment, only two host connections are shown in each RAID controller 302. Furthermore, all interconnections between host computers 108 and RAID Controllers 302 are provided by a controller chassis backplane 344. However, other interconnection structures can be used. For example, any plurality of host connections can be incorporated in the host loop, and the host interface connectors can be located on the RAID Controller itself instead of the controller chassis backplane.

Local host computer 108A is coupled with both RAID controllers 302 by a combination of fibre channel buffers (FCB) 328 (electrical-to-electrical), electrical cables 330, and PBCs 326. This type of interconnection is particularly suited for "local" applications, such as intra-office systems. Remote host computer 108B, in contrast, is coupled by a combination of fibre channel convertors (FCC) 332 (electrical-to-optical), optical cable 334, electrical cables 330, and PBCs 326, which is advantageous for "remote" applications, such as inter-office systems.

FC-AL RAID system 300 includes a plurality of disk modules 348 (e.g., disk modules 348A, 348B, and additional disk modules 348 as desired). Each disk module 348 includes a plurality of dual ported disk assemblies 314. The back-end drive interface from each RAID controller 302 to disk modules 348 is provided by drive loops 322A and 322B. As with host loops 306, drive loops 322 are also operably isolated and independently controlled.

Host loops 306 and drive loops 322 of the present invention provide, with today's technology, approximately 100 MB/s of read bandwidth. At 85% transfer efficiency, these FC-AL loops can support approximately 85 MB/s sustained bandwidth, which represents a significant improvement over conventional systems, such as SCSI RAID system 100 or FC RAID system 200. Correspondingly, the present invention is well suited for data transfer intensive applications, including Video on Demand (VOD). A detailed discussion of several such applications is provided in the above-referenced U.S. patent appl., entitled "Modular And Highly Available RAID System and Method For Video On Demand Applications."

The incorporation of host loops in the RAID Controllers allows for on-line expansion and removal of host connections. In a multi-host environment, it ensures continuous and un-interrupted operation in the event of a host failure. As used herein, the term "failure" refers to any condition (e.g., removal of power, device failure, etcetera) that makes a device unavailable for read/write data transfer. The drive loops 322 also provide modularity on the disk array side of controllers 302 by allowing the on-line insertion or removal of disk assemblies 314 or disk modules 348.

The present invention also provides enhanced fault isolation. With respect to host loops 306, PBCs 326 provide isolation between the various components (e.g., local host computers 108A and remote host computers 108B coupled with host loops 306). Each RAID controller 302 has exclusive access and control of PBCs 326 (or host ports) associated with the respective loop 306. For example, upon the detection of an absent host, a powered down host, or a host failure, each RAID controller 302 individually facilitates a bypass (by operationally removing) of the associated host port from normal loop operations.

Figure 4:
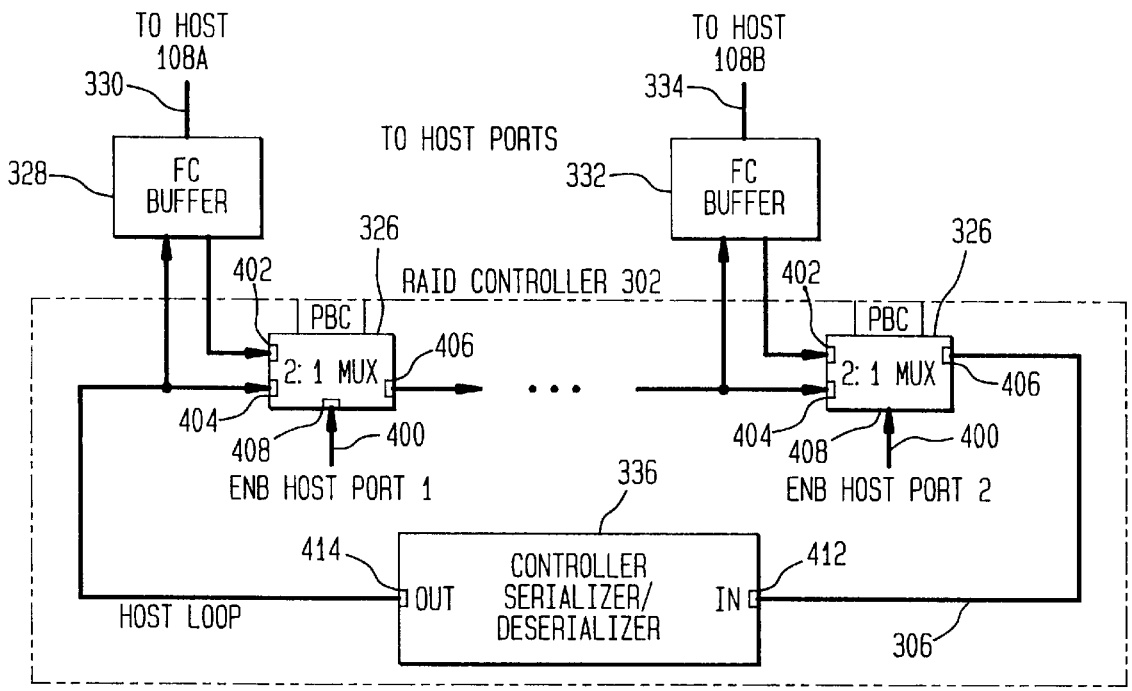
FIG. 4 illustrates a port bypass circuit (PBC) of a host loop in accordance with a preferred embodiment of the present invention.

FIG. 4 illustrates a functional block diagram of host interface loop 306 inside RAID controller 302. It is noted that the configuration and operation of RAID controller 302B is identical to that of RAID controller 302A. In operation, PBCs 326 represent host ports 1 and 2 for local and remote host computers 108. Each PBC 326 has two data inputs 402, 404, an enable control input 408, and a data output 406. With respect to host port 1, in normal operation, an enable bypass signal (ENB) 400 is activated and sent to control input 408 to permit data information presented on data input 402 (from local host 310) to be passed through to data output 406. When a host failure/power down is detected, however, PBC 326 is set for bypass mode. That is, ENB 400 is activated to select data input 404, thereby permitting data information presented at the input (in this instance host loop 306) to be passed through to data output 406.

Serializer/de-serializer module 336 includes an data input 412 and a data output 414 and provides the conduit for data between the host loop 306 to the processing unit (not shown) in RAID controller 302. All host loop control functions such as the generation of signal ENB 400 are the responsibility of the controller module 336. Fault detection is performed by the processing unit (not shown) as is known in the art.

With respect to the disk module-to-RAID controller interface, dual ported disks 314 are coupled via drive loops 322A and 322B. As with host loops 306, PBCs 326 provide isolation between the various components (e.g., disks 314) coupled with drive loops 322. As shown in FIG. 3, each port of disks 314 has an associated PBC 326. Upon a disk failure/removal/power down, the associated RAID controller 302 facilitates a bypass of the particular disk by activating the associated PBC 326. As such, the operation of the corresponding drive loop 322A or 322B, is maintained without interruption.

Overall control of PBCs 326 is provided by environmental controllers (EC) 342 and serializer/de-serializer modules 346 via EC busses 338A and 338B which are coupled with the ports of disks 314. In this preferred embodiment, each EC bus 338 is a commercially available "integrated circuits-to-integrated circuits" communications (I²C) serial bus from Phillips/Signetics. Alternatively, other interconnection structures may be used for EC bus 338, such as an EIA standard RS-232 serial bus, or the Small Form Factor Standard (SFF 8067) using embedded protocol.

ECs 342 access drive status information (e.g. drive present and drive powered) and initiate command controls to drives 314 and their port bypass circuits 326, at the direction of the processing unit (not shown) in RAID controllers 320.

Figure 5:
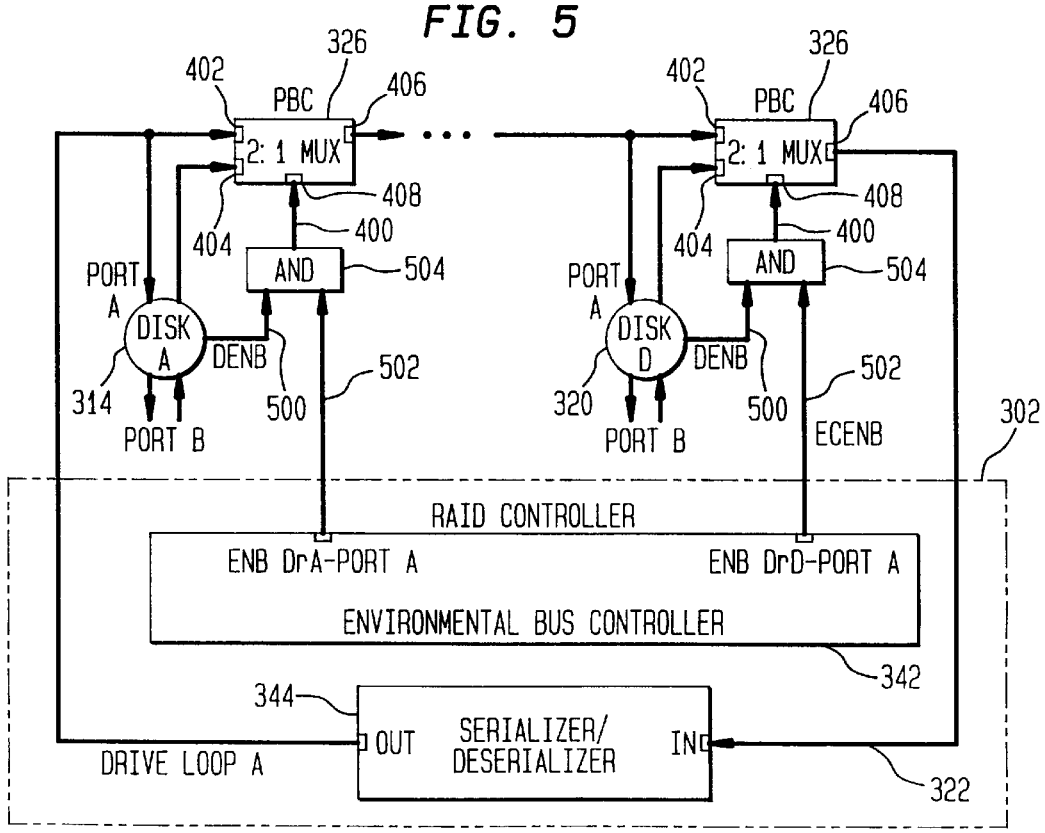
FIG. 5 illustrates a PBC in a drive loop in accordance with a preferred embodiment of the present invention.

A detailed description of the functionality of ECs 342 in conjunction with drive interface loops 322 is provided with reference to FIG. 5. Each disk 314 generates a disk enable (DENB) signal 500, which is activated when the associated drive is ready for loop operation. In addition, ECs 342 also generate an EC enable signal (ECENB) 502. Both DENB 500 and ECENB 502 are input to an AND circuit 504 to generate ENB 400 which controls PBC 326 as described above. Since each drive loop 322 is operably isolated and the port bypass circuit of each drive is controlled by the RAID controller through a separate EC bus, the S RAID controller has complete control to include or exclude a drive in its drive loop.

As such, the disk modules-to-RAID controller interface of the present invention efficiently overcomes the conventional problems associated with RAID subsystems. That is, the failure of one dual ported disk device typically contaminates both of the attached interfaces (e.g., a failed disk typically sends inappropriate data packets on both ports). ECs 342 of the present invention, however, isolate failed disk ports by bypassing the failed disk.

Another advantage of the present invention is that failure of one of RAID controllers 302 or its associated EC bus 338 has no adverse effect on the other drive loop 322. Correspondingly, a "firewall" is created to isolate one drive loop 322 from the other, even though the two loops share the same disk devices.

Figure 6:
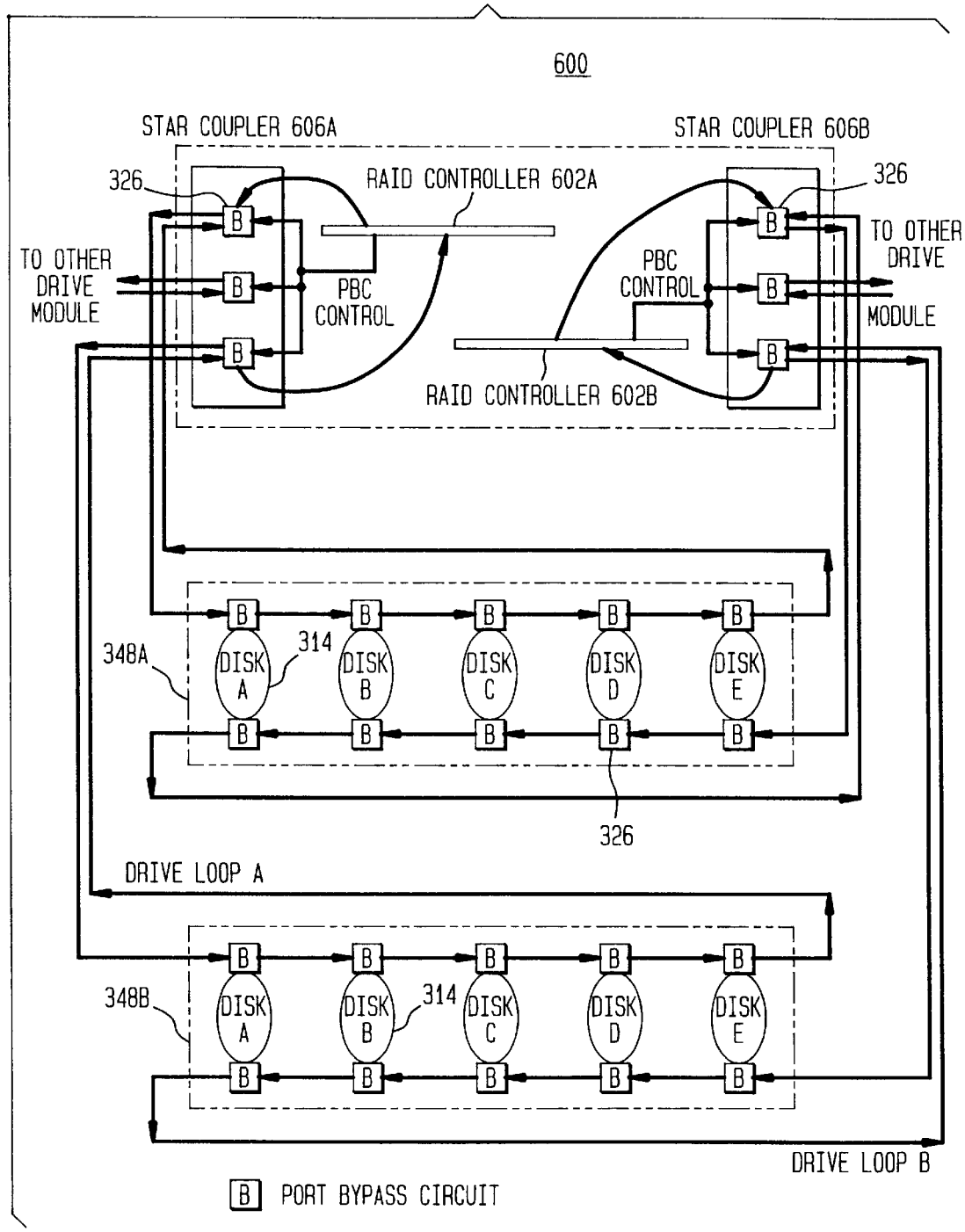
FIG. 6 illustrates a star coupled, highly available FC-AL RAID system in accordance with a preferred embodiment of the present invention.

FIG. 6 illustrates another preferred embodiment of the present invention. As described with relation to the previous preferred embodiment, loop architectures generally require that every loop component participate in the communication for normal operation of the loop. However, if a drive module with multiple disks is connected in a daisy chained manner to other drive modules, it is difficult to remove a drive module in an active loop when it comes to maintenance events, such as field upgrade, expansion or repair. Accordingly, it is common practice today to power down an entire system for such an event.

FIG. 6 describes a star coupled, FC-AL RAID system 600 which provides on-line drive module expansion and repair. In this preferred embodiment, each star coupler comprises a plurality of PBCs 326 operably coupled with respective RAID controllers 602A and 602B. Each RAID controller 602 has independent and full control of its associated star coupler 606.

Each star coupler 606 has a PBC 326 corresponding to each drive module 348. Thus, when a drive module 348 is removed or powered down for repair, as detected by the EC bus (not shown in FIG. 6, see FIG. 3), each RAID controller 602 activates the corresponding PBC 326 in star coupler 606 to remove 5 the inactive drive loops and the inactive drive module from normal loop functions.

Each drive loop also has a PBC 326 corresponding to each drive assembly 314 in drive modules 348. Thus, when a drive assembly 314 is removed or powered down for repair, as detected by the EC bus (not shown in FIG. 6, see FIG. 3), one of RAID controllers 602 activates the corresponding PBC 326 to remove the inactive drive assembly from normal loop functions.

Figure 7:
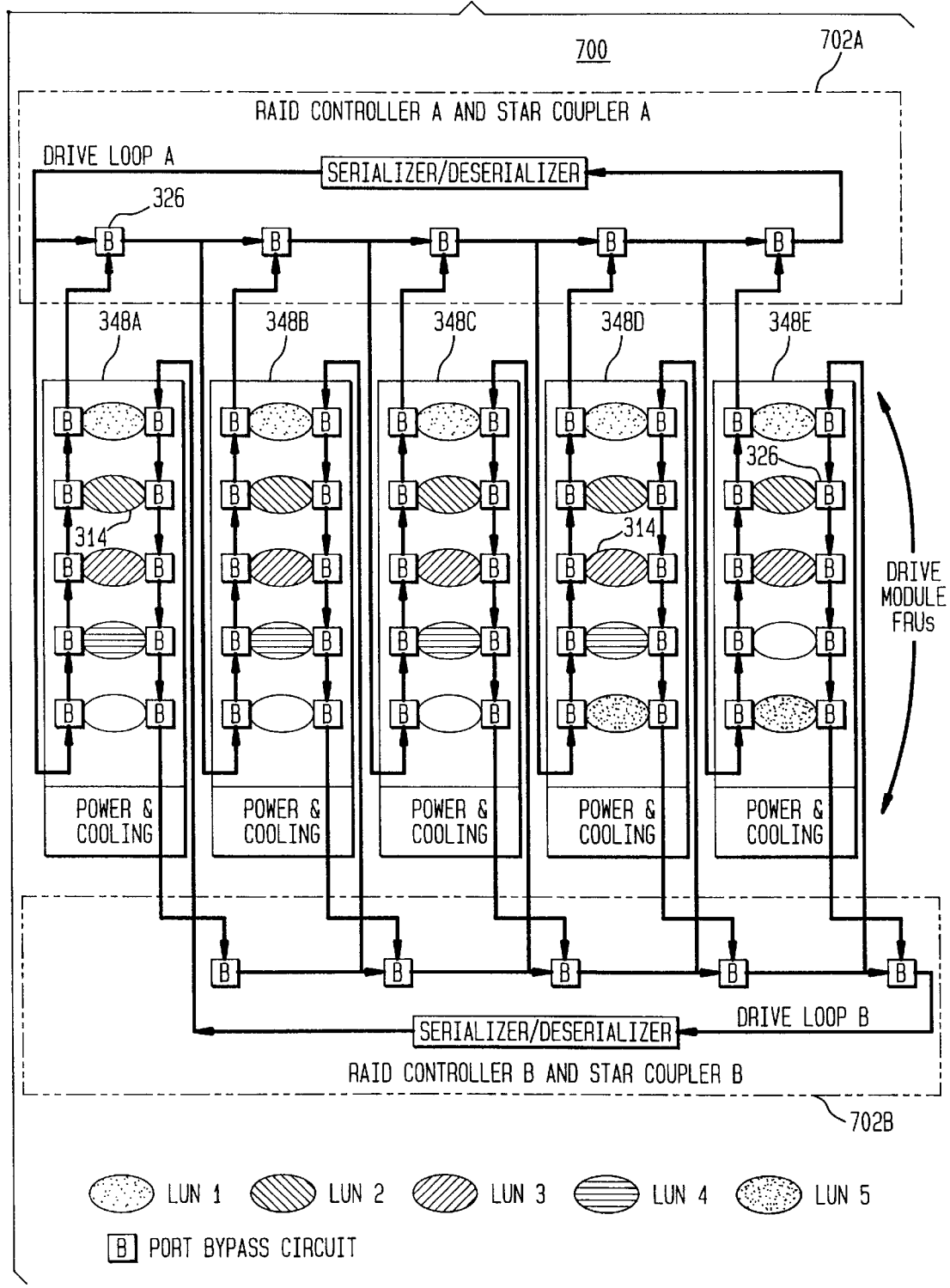
FIG. 7 illustrates a highly available FC-AL coupled RAID system with orthogonal data striping in accordance with a preferred embodiment of the present invention.

FIG. 7 illustrates another embodiment of the present invention; a highly available FC-AL coupled RAID system 700 with orthogonal data striping. In conventional RAID systems, data is striped across the disk assemblies within a drive module. If a drive module fails (e.g., a power supply or other failure that takes the entire drive module out of service), then data on that drive module will not be available. In the embodiment of FIG. 7, however, data is striped orthogonally across multiple drive modules so that a logical unit (LU) comprises data from no more than one disk from each drive module. With this orthogonal data striping, an entire drive module, with multiple disks, can fail without affecting data availability. That is, RAID system 700 can continue to operate with no loss of data while an entire drive module is powered down, removed, or serviced, because data can be re-constructed from the remaining drive modules utilizing well-known error correcting techniques.

Referring to FIG. 7, star coupled, FC-AL RAID system 700, orthogonal data striping is illustrated. RAID System 700 includes RAID controllers 702A and 702B, and drive modules 348A–348E. As illustrated, a LU (e.g., logical unit number or LUN 1) is formed by striping data across drive modules 348A–348E where only one disk assembly 314 from each drive module 348 stores data for the LU. This orthogonal data striping scheme allows an entire drive module to fail without loss of data. The data from the failed disk assemblies can be reconstructed using parity information as is known in the art.

Another benefit of orthogonal data striping is that fault-tolerant power supplies and fans are not required in each drive module, as their failure, confined to a module, does not result in loss of overall data availability. Eliminating the need for redundant power and cooling results in significant cost savings in drive module design.

As disk drives are getting smaller, a greater number of drives can be mounted on a printed circuit board or packaged in small enclosures. As such, orthogonal data striping with a star coupler offers significant advantages over conventional RAID configurations. That is, orthogonal data striping provides RAID systems with a number of small form-factor drives packaged in field replaceable units (FRUs), each self-contained in a small printed circuit board or enclosure with its own power supply and cooling. Therefore when a FRU fails, it is removed and replaced without disruption to normal access to other modules or FRUs.

While the present invention has been particularly shown and described with reference to several preferred embodiments thereof, it will be apparent to a person skilled in the relevant art that various changes in form and details may be made therein without departing from the spirit and scope of the invention as defined in the appended claims.

What is claimed is:

1. A controller for controlling communications between a plurality of host computer systems and a data storage subsystem, comprising:

a first host loop; and a first plurality of port bypass circuits, each port bypass circuit connecting one of said plurality of host computer systems to said host loop, each port bypass circuit bypassing its associated host computer system if said associated host computer system becomes unavailable, wherein communication with remaining host computer systems is uninterrupted by said unavailable host computer system.

2. The controller of claim 1, further comprising:

a second host loop operatively isolated from said first host loop; and a second plurality of port bypass circuits, each port bypass circuit connecting one of said plurality of host computer systems to said second host loop, each port bypass circuit bypassing its associated host computer system if said associated host computer system becomes unavailable, wherein communication with remaining host computer systems is uninterrupted by said unavailable host computer system, wherein said second host loop provides a redundant communication path to said host computer systems.

3. The controller of claim 2, where each of said first and second host loops comprises:

a fiber channel arbitrated host loop.

4. A controller for controlling communications between a plurality of host computer systems and a plurality of storage devices, comprising:

a first drive loop; and a first plurality of port bypass circuits, each port bypass circuit connecting one of said plurality of storage devices to said drive loop, each port bypass circuit bypassing its associated storage device if said associated storage device becomes unavailable, wherein communication with remaining storage devices is uninterrupted by said unavailable storage device.

5. The controller of claim 4, further comprising:

a second drive loop operatively isolated from said first drive loop; and a second plurality of port bypass circuits, each port bypass circuit connecting one of said plurality of storage devices to said second drive loop, each port bypass circuit bypassing its associated storage device if said associated storage device becomes unavailable, wherein communication with remaining storage devices is uninterrupted by said unavailable storage device, wherein said second drive loop provides a redundant communication path to said plurality of storage devices.

6. The controller of claim 5, where each of said first and second drive loops comprises:

a fiber channel arbitrated drive loop.

7. The controller of claim 6, further comprising:

a first environmental control bus for monitoring the status of said plurality of storage devices;

a first environmental bus control circuit for controlling said first plurality of port bypass circuits in response to input from said first environmental control bus.

8. The controller of claim 7, further comprising:

a second environmental control bus for monitoring the status of said plurality of storage devices, said second environment control bus being operably isolated from said first environmental control bus to provide redundancy;

a second environmental bus control circuit for controlling said second plurality of port bypass circuits in response to input from said second environmental control bus.

9. A modular and highly available fibre channel arbitrated loop system for ensuring fault-tolerant operation between a plurality of host computer systems and a data storage array having a plurality of storage devices, the system comprising:

a first controller having a first arbitrated host loop coupling said first controller to a first host computer system;

a first arbitrated drive loop coupling said first controller to the plurality of storage devices;

a second controller having a second arbitrated host loop coupling said second controller to a second host computer system;

a second arbitrated drive loop coupling said second controller to the plurality of storage devices, said second arbitrated host and second arbitrated drive loops being operatively isolated from said first arbitrated host and first arbitrated drive loops;

host bypass means, operably connected between each of said arbitrated host loops and each host computer system, for bypassing an associated host computer system upon failure of said associated computer system, thereby ensuring continued operation of each of said arbitrated host loops; and drive bypass means, operably connected between each of said arbitrated drive loops and each of said storage devices, for bypassing an associated storage device upon failure of said associated device, thereby ensuring continued operation of each of said arbitrated drive loops.

10. A RAID subsystem comprising:

a plurality of disk modules, each disk module having a plurality of disk assemblies;

a first controller having a first drive loop for communicating with said plurality of disk modules;

a second controller having a second drive loop for communicating with said plurality of disk modules, wherein said second drive loop is operably isolated from said first drive loop;

a plurality of first bypass circuits, each first bypass circuit connecting said first drive loop to one of said disk assemblies; and a plurality of second bypass circuits, each second bypass circuit connecting said second drive loop to one of said disk assemblies.

11. The RAID subsystem of claim 10, wherein each controller further comprises:

a plurality of third bypass circuits interposed in said first and second drive loops for bypassing a failed disk module.

12. The RAID subsystem of claim 11, further comprising:

a plurality of orthogonal logical units for storing data, each logical unit being formed from not more than one disk assembly of each disk module, wherein each of said orthogonal logical units can assure data integrity despite a failure of one of said disk modules.

13. A method for operating an array of storage devices to store data, the method comprising the steps of:

organizing the plurality of storage devices into a plurality of storage modules so that each of said storage modules includes a plurality of storage devices, wherein the storage devices of each storage module share common power and cooling resources;

forming logical units orthogonally across said storage modules, each logical unit including not more than one storage device from each of said storage modules; and reading and writing blocks of data to/from said logical units, wherein data integrity is assured in the event of failure of any one storage module.

\* \* \* \* \*